United States Patent Office 3,480,611
Patented Nov. 25, 1969

3,480,611
AZO DYESTUFFS CONTAINING A 2-ORGANO SULFONYLBENZOTHIAZOLE GROUP
Horst Jäger and Walter Horstmann, Cologne-Buchheim, and Karl-Heinz Schündehütte, Opladen, Kersten Trautner, Cologne-Stammheim, Edgar Siegel, Leverkusen, and Klaus Sasse, Cologne-Stammheim, Germany, assignors to Farbenfabriken Bayer Aktiengesellschaft, Leverkusen, Germany, a corporation of Germany
No Drawing. Filed May 18, 1966, Ser. No. 550,915
Claims priority, application Germany, May 24, 1965, F 46,133
Int. Cl. C09b 45/28; D06p 1/10; C07d 91/44
U.S. Cl. 260—145
16 Claims

ABSTRACT OF THE DISCLOSURE

A dyestuff of the formula

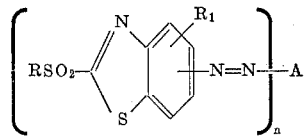

wherein A stands for the residue of a coupling component, $R_1$ is hydrogen or a substituent, R is an aliphatic, carbocyclic, or heterocyclic substituent, and $n$ is a number ranging from 1 to 2. The dyestuffs are useful in the dyeing of especially natural and regenerated cellulose textiles as well as those of wool, silk, polyamides, and polyurethanes with excellent fastness to wet processing.

---

The present invention relates to valuable new reactive dyestuffs of the general structure

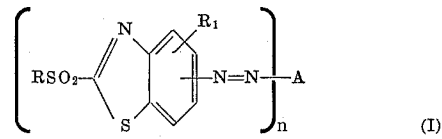

In this formula A denotes the radical of an azo component, $R_1$ is hydrogen or a substituent, R is an aliphatic, carbocyclic or heterocyclic radical and $n$ is a number of 1 to 2.

Suitable reactive substituents —$SO_2R$ in the 2-position of the benzothiazole ring are, inter alia, lower alkylsulphonyl radicals, preferably with 1 to 5 carbon atoms, such as methylsulphonyl, ethylsulphonyl or propylsulphonyl radicals; arylsulphonyl radicals, such as phenylsulphonyl, p-toluene-sulphonyl, p-chlorophenylsulphonyl, m - carboxyphenylsulphonyl radicals; aralkylsulphonyl radicals, such as benzylsulphonyl anrd p-toluylmethylsulphonyl radicals; and also heterosulphonyl radicals, such as 2-benzothiazole-sulphonyl.

Examples of substituents $R_1$ are: alkyl, aryl and aralkyl radicals, sulphonic acid, carboxylic acid, halogen substituents, such as chlorine and bromine substituents, furthermore hydroxy, alkoxy, cyano groups and sulphonamide groups which may be substituted.

Dependent upon the type of their substituents, the new dyestuffs of Formula I may be water-soluble as well as hardly soluble or insoluble in water.

The azo component A may contain the substituents customary for dyestuffs, such as sulphonic acid, carboxylic acid, optionally substituted sulphonamide, sulphone, alkylamino, aralkylamino, arylamino, acylamino, nitro, cyano, halogen, hydroxyl, alkoxy, azo, azoporphin groupings and the like. The dyestuffs may moreover contain further groupings capable of fixation, such as mono-, di- or trihalopyrimidinyl-amino, mono- or di-triazinyl-amino, esterified sulphonic acid-hydroxyalkyl amide and -hydroxyalkylsulphone groups and other reactive groups which are known in large numbers.

The new dyestuffs can be metal-free or metal-containing and they may be mono- or polyazo dyestuffs.

Diazo components, suitable for the manufacture of the novel dyestuffs of the benzothiazole series of the formula

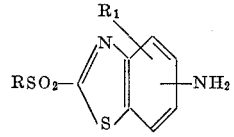

which contain a reactive sulphonyl substituent in the 2-position are, for example:

7-amino-2-methylsulphonyl-benzothiazole
6-amino-2-methylsulphonyl-benzothiazole
5-amino-2-methylsulphonyl-benzothiazole
4-amino-2-methylsulphonyl-benzothiazole
5-amino-6-methyl-2-methylsulphonyl-benzothiazole
6-amino-7-methyl-2-methylsulphonyl-benzothiazole
5-amino-6-chloro-2-methylsulphonyl-benzothiazole
5-amino-6-methoxy-2-methylsulphonyl-benzothiazole
6-amino-4-sulpho-2-methylsulphonyl-benzothiazole
6-amino-5-sulpho-2-methylsulphonyl-benzothiazole
6-amino-7-sulpho-2-methylsulphonyl-benzothiazole
6-amino-2-(4′-tolylsulphonyl)-benzothiazole
6-amino-5-chloro-2-methylsulphonyl-benzothiazole
6-amino-5-methoxy-2-methylsulphonyl-benzothiazole
6-amino-5-methyl-2-methylsulphonyl-benzothiazole
4-amino-6-methyl-2-methylsulphonyl-benzothiazole
4-amino-6-methoxy-2-methylsulphonyl-benzothiazole
4-amino-6-chloro-2-methylsulphonyl-benzothiazole In the range of the said classes of dyestuffs, the dyestuffs of the following general Formulae II to XI are especially valuable, inter alia:

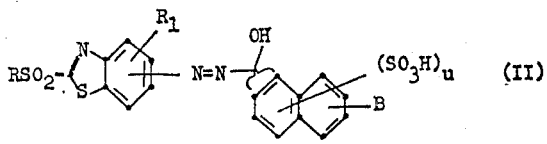

in which B stands for hydrogen, alkoxy or an acylamino or arylamino substituent, $u$ for a number of 1 to 3, R and $R_1$ have the meaning stated above.

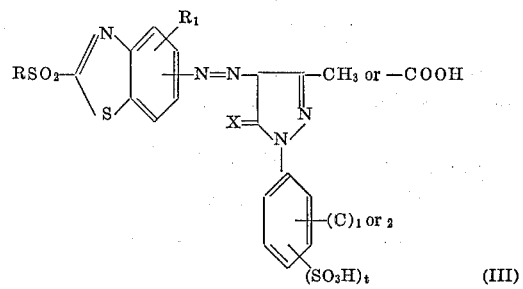

in which X stands for O or HN, C for hydrogen or a substituent, such as chlorine, bromine or alkyl, R and $R_1$ have the meaning stated above, $t$ stands for 1 or 2.

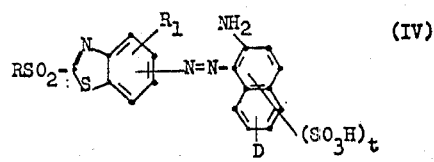

in which D stands for hydrogen, a hydroxyl or acylamino group, R, $R_1$ and $t$ have the meaning stated above.

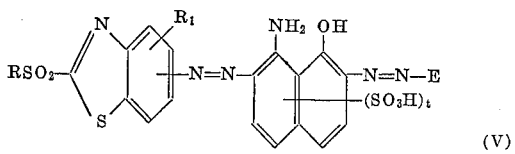

(V)

in which E stands for the radical of a diazo component, preferably of the benzene or naphthalene series, R, $R_1$ and $t$ have the meaning stated above.

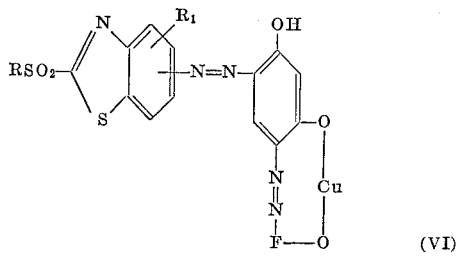

(VI)

in which F stands for a phenyl radical which is substituted by one or more sulphonic acid groups and in which the azo and —O— groupings stand in o-position to one another, and R and $R_1$ have the meaning stated above.

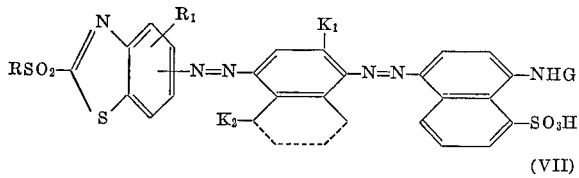

(VII)

in which G denotes an acyl group, $K_1$ and $K_2$ stand for hydrogen or a substituent, such as methyl, methoxy, an acylamino group or a ω-methane-sulphonic acid group.

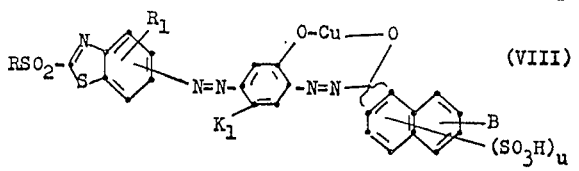

(VIII)

in which R, $R_1$, B, $K_1$ and $u$ have the meaning stated above.

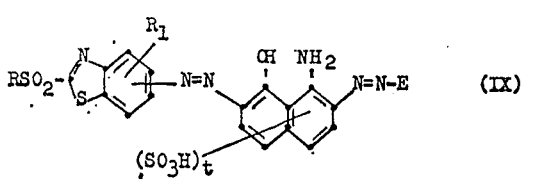

(IX)

in which E stands for the radical of a diazo component, preferably of the benzene or naphthalene series, R, $R_1$ and $t$ have the meaning stated above.

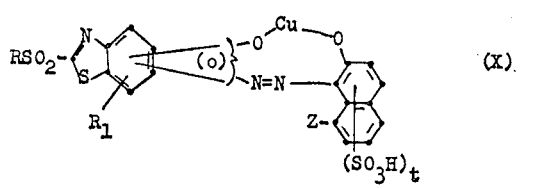

(X)

in which Z denotes a hydroxyl group, R, $R_1$ and $t$ have the meaning stated above.

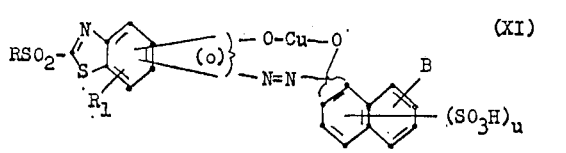

(XI)

in which R, $R_1$, B and $u$ have the meaning stated above.

Among the dyestuffs of the Formulae I to XI those are of particular interest in which the azo grouping stands in the 5- or 6-position of the benzene ring of the benzothiazole component.

The new dyestuffs of the Formula I are obtained, when diazotised aminobenzothiazoles of the formula

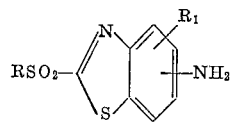

are coupled with the coupling components in a mineral acid, acetic acid, neutral or soda-alkaline medium, depending on the coupling component employed. Preferred azo components are those of the series of aminobenzenes, hydroxybenzenes, hydroxynaphthalenes, aminonaphthalenes, pyrazolenes, aminopyrazoles and acetic acid amides. Of the large number of suitable azo components, the following compounds may be mentioned by way of example:

1-amino-3-methyl-benzene,
1-amino-3-methyl-6-methoxybenzene,
1-amino-benzene-3-sulphoacetylamino-benzene, resorcinol,
1-amino-benzene-3-ω-methane-sulphonic acid,
1-hydroxynaphthalene-4-sulphonic acid,
1-hydroxynaphthalene-4,8-disulphonic acid
1-hydroxynaphthalene-3,6-disulphonic acid
1-hydroxynaphthalene-4,7-disulphonic acid
1-hydroxynaphthalene-3,8-disulphonic acid
1-hydroxynaphthalene-3,6,8-trisulphonic acid
2-hydroxynaphthalene-3,6-disulphonic acid
2-hydroxynaphthalene-6,8-disulphonic acid
2-hydroxynaphthalene-5,7-disulphonic acid
2-hydroxynaphthalene-6-sulphonic acid
2-hydroxynaphthalene-5-sulphonic acid
1-amino-naphthalene-6,7 and -8-sulphonic acid
2-amino-naphthalene-5-sulphonic acid
2-amino-naphthalene-5,7-disulphonic acid
1,3-dihydroxynaphthalene-5,7-disulphonic acid
1-hydroxy-8-acetamino-naphthalene-3,6-disulphonic acid
1-hydroxy-8-acetamino-naphthalene-3,5-disulphonic acid
1-hydroxy-8-benzoylamino-naphthalene-3,5-disulphonic acid
1-hydroxy-8-benzoylamino-naphthalene-3,6-disulphonic acid
1-hydroxy-8-amino-naphthalene-3,6-disulphonic acid
1-hydroxy-8-amino-naphthalene-3,5-disulphonic acid
1-hydroxy-7-amino-naphthalene-3,6-disulphonic acid
1-hydroxy-7-amino-naphthalene-3-sulphonic acid
1-hydroxy-6-amino-naphthalene-3-sulphonic acid
1-hydroxy-6-amino-naphthalene-3,5-disulphonic acid
1-hydroxy-7-(3'-sulphophenyl-)amino-naphthalene-3-sulphonic acid
1-hydroxy-6-(4'-sulphophenyl-)amino-naphthalene-3-sulphonic acid
1-hydroxy-6-acetamino-naphthalene-3-sulphonic acid
1-hydroxy-8-amino-naphthalene-5,7-disulphonic acid
1-hydroxy-8-acetamino-naphthalene-5-sulphonic acid
1-(4'-sulphophenyl-)pyrazolone-5-carboxylic acid-3
1-(4'-sulpho-2'-methylphenyl-)pyrazolone-5-carboxylic acid-3
1-(2',5'-dichloro-4'-sulphophenyl-)3-methyl-pyrazolone-5
1-(4'-sulphophenyl-)3-methyl-pyrazolone-5
1-(4'-sulpho-2'-methyl-)3-methyl-pyrazolone-5
1-(2',5'-disulphophenyl-)3-methyl-pyrazolone-5
1-(4'-sulphophenyl-)3-methyl-5-amino-pyrazole If the monoazo dyestuffs obtainable according to the invention still contain diazotisable amino groups, they can be diazotised by a conventional method and again reacted with a suitable coupling component to produce disazo dyestuffs. Another possibility of synthetising diazo dyestuffs consists in preparing monoazo dyestuffs which still contain coupling positions and to combine them with suitable diazo components, the aminobenzothiazole-diazo components carrying a reactive sulphonyl substituent in the 2-position, which are to be used according to the invention, being employed for the first or second, or also for a later coupling step.

As azo components serving for the synthesis of the monoazo dyestuffs there are chiefly used those of the series of dihydroxybenzenes, dihydroxynaphthalenes and amino-hydroxy-naphthalenes mentioned above.

As the second or subsequent diazo components for the synthesis of disazo dyestuffs there may be used, inter alia:

1-aminobenzene-2,3 and -4-sulphonic acid
1-aminobenzene-2,4-disulphonic acid
1-aminobenzene-2,5-disulphonic acid
1-amino-2-hydroxybenzene-3,5-disulphonic acid
1-amino-2-hydroxybenzene-5-sulphonic acid
1-amino-2-hydroxy-3-chlorobenzene-5-sulphonic acid
1-amino-2-hydroxy-3-nitrobenzene-5-sulphonic acid
1-aminonaphthalene-1,5-disulphonic acid
2-aminonaphthalene-1-sulphonic acid and those of the series of 4,5,6- and 7-amino-2-methyl-sulphonyl-benzothiazoles. Diazo components of this group can also be used twice.

If the dyestuffs produced according to the invention contain groups forming metal complexes, they can be transformed into their 1:1 or 1:2 metal complex compounds by the reaction with metal-yielding agents, for example, copper, nickel, chromium or cobalt salts.

The groups forming metal complexes can be introduced, for example, by combining diazo components with azo components and choosing the components so that the azo group stands between two o-positioned groups forming metal complexes, such as hydroxyl groups. Alternatively, it is also possible to introduce, in addition to a hydroxyl group already present, a second hydroxyl group by the method of oxidative coppering, and thus to build up metal complexes. The last-mentioned process permits to obtain metal complexes also from monoazo dyestuffs containing 4,5,6- or 7-amino-2-methylsulphonyl-benzothiazole as diazo component.

The new dyestuffs are extremely valuable products which are suitable for a great variety of applications. The water-soluble dyestuffs, especially those containing sulphonic acid groups, are interesting mainly for the dyeing of textile material containing hydroxyl groups or nitrogen, especially textile materials of natural and regenerated cellulose, and also of wool, silk, synthetic polyamide and polyurethane fibres. Due to the reactive sulphonyl substituent(s) in the 2-position of the thiazole ring, these products are especially suitable as reactive dyestuffs for the dyeing of cellulose materials by the methods known for this purpose. The fastness properties achieved are excellent, particularly the fastness to wet processing. The high yield of the new reactive dyestuffs is also worth mentioning.

In the following examples which are given for the purpose of illustrating the invention, the parts stand for parts by weight, unless otherwise stated; the temperatures are given in degrees centigrate.

EXAMPLE 1

13.2 parts 2-methylsulphonyl-6-amino-benzothiazole are stirred in 100 parts by volume ice-water and 16 parts by volume concentrated hydrochloric acid; a solution of 4.1 parts sodium nitrite in 10 parts by volume water is added thereto in one jet. The diazo compound dissolves with a yellow colour. After removal of the excess nitrous acid, the diazo solution is added to a solution of 17.6 parts 2-hydroxynaphthalene-3,6-disulphonic acid and 10 parts sodium carbonate in 200 parts ice-water. The coupling is rapidly completed. The dyestuff filtered off with suction and dried at 50°. A red powder is obtained. In the form of the free sulphonic acid the resultant dyestuff corresponds to the following formua:

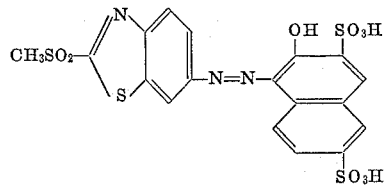

The dyestuff dyes cellulose in red shades of very good fastness properties, especially very good fastness to wet processing.

When a procedure analogous to the method of the present example is followed, but with the use of the components listed in the following table, reactive dyestuffs are also obtained, which, when applied by one of the usual methods, yield fast dyeings the shades of which are also stated in the table.

| Number: | Diazo component | Coupling compojent | Shade |
|---|---|---|---|
| 2 | 2-methylsulphonyl-6-amino-benzothiazole | 2-hydroxynaphthalene-6,8-disulphonic acid | Yellow. |
| 3 | do | 1-hydroxy-8-benzoylaminonaphthalene-3,5-disulphonic acid. | Red. |
| 4 | do | 1-hydroxy-8-acetylaminonaphthalene-3,5-disulphonic acid. | Red. |
| 5 | do | 1-hydroxy-8-acetylaminonaphthalene-3,6-disulphonic acid. | Bluish red. |
| 6 | do | 1-hydroxynaphthalene-4,7-disulphonic acid | Scarlet. |
| 7 | do | 1-hydroxynaphthalene-4,8-disulphonic acid | Do. |
| 8 | 7-methyl-6-amino-2-methylsulphonyl-benzothiazole. | 1-hydroxy-8-acetylaminonaphthalene-3,6-disulphonic acid. | Red. |
| 9 | 4-sulpho-6-amino-2-methylsulphonyl-benzothiazole. | do | Red. |
| 10 | 6-amino-5-methoxy-2-methylsulphonylbenzthiazole. | 2-hydroxynaphthalene-3,6-disulphonic acid | Red. |
| 11 | 5-amino-6-methoxy-2-methylsulphonylbenzthiazole. | do | Red. |
| 12 | 6-amino-7-methoxy-2-methylsulphonylbenzthiazole. | do | Red. |
| 13 | 6-amino-5-sulpho-2-methylsulphonylbenzthiazole. | do | Red. |

EXAMPLE 14

The diazo solution prepared according to Example 1 from 6-amino-2-methylsulphonyl-benzothiazole is mixed with a neutral solution of 16.5 parts 1-(4'-sulphophenyl)-pyrazolone-5-carboxylic acid-3. The pH value is lowered to 4–5 by the addition of sodium acetate, whereupon rapid coupling occurs. The dyestuff is filtered off with suction and dried at 50°. A yellow powder is obtained. The resultant dyestuff corresponds to the following formula:

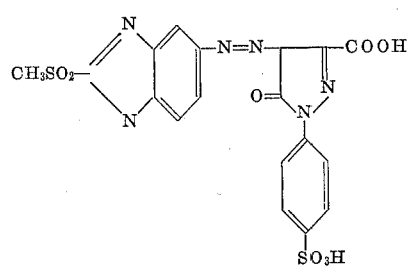

When a cellulose fabric is printed with a printing paste containing, per kilogram, 10 g. of the dyestuff, 100 g. urea, 300 ml. water, 500 g. alginate thickener (60 g. sodium alginate per kg. thickener) and 10 g. sodium carbonate, and which has been made up to 1 kg. with water, the fabric is then dried, steamed at 105° for 1 minute, rinsed with hot water and soaped at the boil, an intense reddish yellow print of good fastness to wet processing and light is obtained.

When the procedure described in the present example is followed, but with the use of the diazo and coupling components listed in the following table, valuable reactive dyestuffs are also obtained.

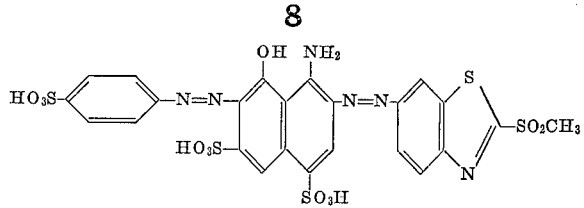

| | Diazo component | Coupling component | Shade |
|---|---|---|---|
| Number: | | | |
| 15 | 2-methylsulphonyl-6-amino-benzothiazole | 1-(3'-sulphophenyl)-3-methyl-pyrazolone-5 | Yellow. |
| 16 | do | 1-(2',5'-dichloro-4'-sulpho-phenyl)-3-methyl-pyrazolone-5. | Do. |
| 17 | do | 1-(4'-sulphophenyl)-3-methyl-pyrazolone-5 | Do. |
| 18 | do | 1-(2'-methyl-4'-sulphophenyl)-3-methyl-pyrazolone-5. | Do. |
| 19 | 6-amino-5-methoxy-2-methylsulphonyl-benzthiazole. | 1-(4'-sulphophenyl)-pyrazolone-(5)-3-carboxylic acid. | Do. |
| 20 | 5-amino-6-methoxy-2-methylsulphonyl-benzthiazole. | do | Do. |
| 21 | 6-amino-5-sulpho-2-methylsulphonyl-benzthiazole. | do | Do. |

EXAMPLE 22

14 parts 2-methylsulphonyl - 6 - amino-7-methyl-benzothiazole are stirred with 100 parts by volume ice-water and 16 parts by volume concentrated hydrochloric acid. 4.1 parts sodium nitrite dissolved in a little water are added in one jet, whereupon an almost clear yellow solution of the diazonium salt is obtained. After destroying the excess nitrite, a neutral solution of 18.5 parts 1-hydroxy-7-aminonaphthalene-3,6-disulphonic acid in 100 parts water is added dropwise; the coupling is completed after stirring for several hours. After filtering off with suction and drying, a red powder is obtained. The dyestuff corresponds to the following formula:

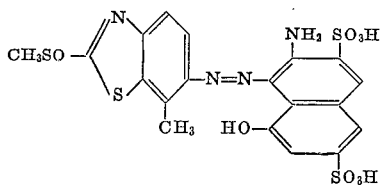

and dyes cellulose in red shades.

The following table gives dyestuffs which are prepared in analogy with the instructions of the present example, but with the use of other starting components.

A fabric of cotton or regenerated cellulose can be dyed with this dyestuff in the following manner:

50 grams cotton skein are dyed in 1 litre of a dyebath containing 1.5 g. of the above dyestuff by raising the temperature from 20° to about 80° within 30 minutes while adding a total of 50 g. sodium chloride in several portions, subsequently adding 20 g. trisodium phosphate and treating the material at the said temperature for 60 minutes. After rinsing, soaping at the boil and drying, a clear navy blue dyeing of good fastness to wet processing, rubbing and light is obtained.

It is also possible to proceed as follows: a cotton fabric is impregnated with a solution at 20–25° containing, per litre liquor, 20 g. of the above dyestuff and 0.5 g. of a non-ionic wetting agent (e.g. a polyethoxylated oleyl alcohol), 150 g. urea and 15 g. sodium bicarbonate, and the fabric is subsequently squeezed between two rubber rollers to a moisture content of about 100%. After an intermediate drying at 50–60°, the fabric is heated at 140° for 10 minutes and the dyeing thus obtained is thoroughly rinsed with hot water and treated at the boil for 20 minutes with a solution containing, per litre, 5 g. Marseilles soap and 2 g. sodium carbonate. After rinsing and drying, an intense navy blue dyeing of good fastness to wet processing, rubbing and light is obtained.

| | Diazo component | Coupling component | pH value of coupling medium | Shade |
|---|---|---|---|---|
| Number: | | | | |
| 23 | 2-methyl-sulphonyl-4-sulpho-6-amino-benzothiazole | 1-hydroxy-7-amino-naphthalene-3-sulphonic acid | Mineral acid | Red. |
| 24 | 2-methyl-sulphonyl-6-amino-benzothiazole | 2-amino-naphthalene-5,7-disulphonic acid | Acetic acid | Orange. |

EXAMPLE 25

A neutral solution of 18.5 parts 1-hydroxy-8-amino-naphthalene-3,5-disulphonic acid in 100 parts by volume water is added dropwise to the diazo solution prepared according to the instructions of Example 1 from 6-amino-2-methylsulphonyl-benzothiazole. Coupling is completed after stirring for 2–3 hours. The monoazo dyestuffs is filtered off with suction, slurried in 100 parts by volume water, neutralised with sodium carbonate and, after the addition of 10 parts sodium carbonate, mixed with a diazo solution prepared from 10.1 parts p-sulphanilic acid. After briefly stirring at 10°, the coupling is completed. The dyestuff is separated by the addition of potassium chloride. It is a black powder which dissolves in water with a blue colour. In the form of the free sulphonic acid the dyestuff corresponds to the following formula Similar results are also obtained by proceeding according to the first-mentioned method of application (dyeing from a long bath), but carrying out the addition of salt and the after-treatment with trisodium phosphate for one hour at room temperature (20–30°), instead of at 80°. This applies also to the last-mentioned method (pad-dyeing): blue dyeings with the fastness properties mentioned above are also obtained with the use of 15 g. sodium bicarbonate, as stated, or of 10 g. sodium carbonate, instead of 15 g. sodium bicarbonate, and by storing of the cellulose fabric, after squeezing it to a moisture content of 100%, at room temperature for 5–20 hours, instead of intermediate drying and heating at 140°.

The following table gives dyestuffs which are obtained from the stated components in analogy with the method described in Example 25.

TABLE

| Number | Diazo component for acidic coupling in o-position to —NH² | Middle component | Diazo component for alkaline coupling in o-position to —OH | Shade of dyeing on cellulose |
|---|---|---|---|---|
| 26 | 2-methylsulphonyl-6-amino-benzothiazole. | 1-hydroxy-8-amino-naphthalene-3,5-disulphonic acid. | 1-aminobenzene-2-sulphonic acid | Navy blue. |
| 27 | do | do | Aminobenzene | Do. |
| 28 | do | do | 1-aminobenzene-2,5-disulphonic acid | Do. |
| 29 | do | do | 1-aminobenzene-2,4-disulphonic acid | Do. |
| 30 | do | do | 1-aminobenzene-3-sulphonic acid | Do. |
| 31 | do | 1-hydroxy-8-amino-naphthalene-3,6-disulphonic acid. | Aminobenzene | Greenish dark-blue. |
| 32 | do | do | 1-aminobenzene-4-sulphonic acid | Do. |
| 33 | do | do | 1-aminobenzene-2-sulphonic acid | Do. |
| 34 | do | do | 1-aminobenzene-2,4-disulphonic acid | Do. |
| 25 | do | do | 1-aminobenzene-2,5-disulphonic acid | Do. |
| 36 | 1-aminobenzene-4-sulphonic acid | do | 2-menthylsulphonyl-6-amino-benzothiazole. benzothiazole. | Do. |
| 37 | 2-methylsulphonyl-6-amino-benzthiazole. | do | 4-amino-azobenzene-3,4-disulphonic acid. | Do. |
| 38 | 1-amino-benzene-3-sulphonic acid | do | 6-amino-5-sulpho-2-methylsulphonyl-benzthiazole. | Do. |

EXAMPLE 39

18.7 parts of 2-ethylsulphonyl-6-amino-benzthiazole-5-sulphonic acid are diazotised. The diazo compound is filtered with suction and the wet paste added to an aqueous neutral solution of 14.7 parts of 1-(4'-sulphophenyl)-3-methyl-pyrazolone-5 in 500 parts by volume of ice-water. After the addition of sodium acetate a pH value of 4 to 5 is maintained. After completion of the coupling the dyestuff formed is precipitated with 20% of sodium chloride, filtered with suction and dried at 50° C.; it corresponds to the probable formula:

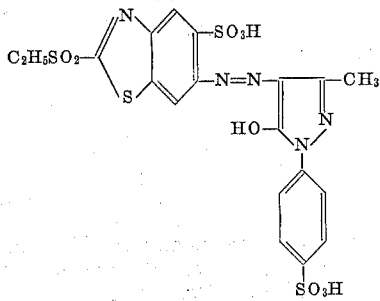

The dyestuff dissolves in water with a yellow coloration and dyes cotton according to the processes given in the preceding examples yellow shades having very good wet and light fastness properties.

The diazo component used in this example can be prepared as follows:

140 parts of 2-ethylsulphonyl-6-amino-benzthiazole are added to 440 parts of sulfuric acid monohydrate. The temperature of the reaction mixture raises from about 20° C. to 70° C. At 70° C. to 80° C. 670 parts of 20% oleum are added dropwise within 1 hour, the reaction mixture then heated to 120° C. and kept at this temperature for 1 hour. The reaction temperature is subsequently cooled down to room temperature and the mixture poured into 1300 parts of ice, filtered with suction and washed with saturated sodium chloride solution until neutral reaction of the washing liquor is obtained.

If proceeding according to the process for manufacturing the dyestuff in this example but using the starting components given in the following table reactive dyestuffs having similar dyeing properties are obtained.

EXAMPLE 40

18.7 parts of 2-ethylsulphonyl-6-aminobenzthiazole-5-sulphonic acid are diazotised and the slightly soluble diazo compound filtered with suction. The suspension of the diazo compound is then given to 500 parts of water and treated with a neutral solution of 12.9 parts of 1-aminonaphthalene-6-sulphonic acid. After stirring for several hours in acetic acid medium the coupling is completed. The monoazo dyestuff formed corresponds to the probable formula:

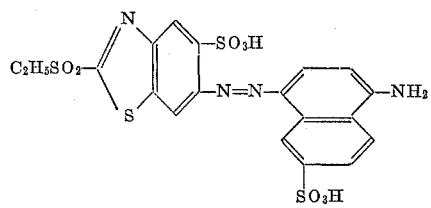

It is again diazotised and coupled in bicarbonate alkaline medium with 17.6 parts of 1-hydroxynaphthalene-4,8-disulphonic acid. After the addition of sodium chloride the disazo dyestuff formed is precipitated. The wet paste is then stirred with 500 parts by volume of water. 80 parts by volume of 20% sodium acetate solution and 80 parts by volume of 18% of copper sulfate solution are added together with 150 parts by volume of a 3% hydrogen peroxide solution at room temperature. After completion of the oxidative coppering the copper complex dyestuff is precipitated with potassium chloride. It dissolves in water with dark green coloration and dyes cotton according to the processes given in the preceding examples dark green shades with good fastness to light. The dyestuff corresponds to the probable formula

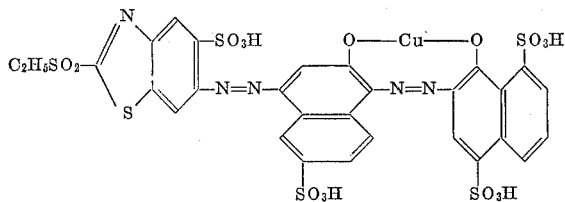

| Diazo component | Coupling component | Shade |
|---|---|---|
| 2-ethylsulphonyl-6-amino-benzthiazole-5-sulphonic acid | 1-(3'-sulphophenyl)-3-methyl-pyrazolone-5 | Yellow. |
| Do | 1-(2'-methyl-4'-sulphophenyl)-3-methyl-pyrazolone-5 | Do. |
| Do | 1-(4'-sulphophenyl)-3-carboxy-pyrazolone-5 | Reddish yellow. |
| Do | Ni-phthalocyanine$\begin{bmatrix}(SO_3Na)_2\\ SO_2NH-\bigcirc-N\begin{matrix}HO\\ \\ CH_3\end{matrix}\end{bmatrix}_2$ | Green. |

EXAMPLE 41

14 parts of 2-ethylsulphonyl-6-amino-benzthiazole are pasted with 200 parts by volume of ice-water and 16 parts by volume of concentrated hydrochloric acid. Into this suspension there is poured a solution of 4.1 parts of sodium nitrite in 10 parts by volume of water. The diazo compound dissolves after short stirring with yellow coloration. Excess nitrite is removed by the addition of amido sulphonic acid. After adding concentrated sodium acetate solution a pH value of 1.5 is kept constant. Then a neutral solution of 18.5 parts of 1-hydroxy-8-aminonaphthalene-3,6-disulphonic acid in 100 parts by volume of water are added dropwise within 1 hour. After further stirring for several hours the acid coupling is finished. The reaction mixture is subsequently neutralized by means of soda and after the further addition of 10 parts of soda treated with the diazonium salt solution prepared from 10.1 parts of 1-aminobenzene-2-sulphonic acid. After completion of the coupling the dyestuff formed is precipitated with the addition of potassium chloride. After drying the dyestuff represents a black powder which dissolves in water with blue coloration. In form of the free acid it corresponds to the probable formula

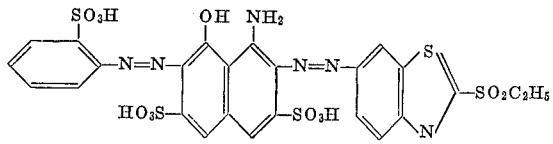

The dyestuff dyes cotton in accordance with one of the processes described in the preceding examples strong navy blue to black shades having good fastness to wet processing and to rubbing.

If using instead of 1-aminobenzene-2-sulphonic acid as diazo component in the second coupling reaction the same amount of 1-aminobenzene-3-sulphonic acid or 1-aminobenzene-4-sulphonic acid or the equivalent amount of aniline or 2-amino-naphthalene-1,5-disulphonic acid one likewise obtains valuable reactive dyestuffs which dye cotton strong navy blue to black shades.

EXAMPLE 42

14 parts of 2-ethylsulphonyl-6-aminobenzthiazole are diazotised and the diazo suspension added dropwise to a solution of 17.6 parts of 1-hydroxy-naphthalene-4,8-disulphonic acid and 16 parts of sodium bicarbonate in 200 parts by volume of ice-water. After completion of the coupling 80 parts by volume of a 20% sodium acetate solution as well as 80 parts by volume of an 18% copper sulphate solution are added. 200 parts by volume of a 3% hydrogen peroxide solution are then added at room temperature. After completion of the oxidative coppering the copper complex compound is precipitated by means of potassium chloride. After drying at 50° C. one obtains a dark powder which dissolves in water with violet coloration and dyes cotton strong reddish violet shades having good fastness to light and to wet processing. In form of its free acid the dyestuff corresponds to the probable formula

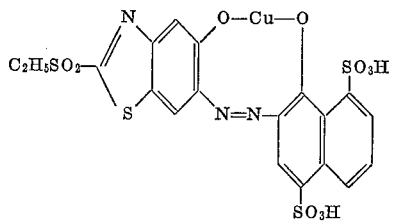

In the following table there are listed further diazo and coupling components which can be combined in accordance with the process described in this example thus giving further valuable reactive dyestuffs which dye cotton in the shades indicated below.

| Diazo component | Coupling component | Shade |
| --- | --- | --- |
| 2-ethylsulphonyl-6-amino-benzthiazole | 2-hydroxy-napthalene-3,6-disulphonic acid | Ruby. |
| Do | 2-hydroxy-naphthalene-5,7-disulphonic acid | Do. |
| Do | 2-hydroxy-naphthalene-6,8-disulphonic acid | Do. |
| Do | 1-hydroxy-naphthalene-3,6- or -4,6- or -4,7-disulphonic acid | Reddish violet. |
| Do | 1-hydroxy-naphthalene-3,6,8-trisulphonic acid | Violet. |
| Do | 1-hydroxy-6-ureido-naphthalene-3,5-disulphonic acid | Ruby. |
| Do | 1-hydroxy-8-acetamino (or benzoylamino)-naphthalene-3,6-disulphonic acid | Violet. |
| Do | 1-hydroxy-8-acetamino (or benzoylamino)-naphthalene-3,5-disulphonic acid | Do. |

EXAMPLE 43

40 parts of the trisodium salt of the dyestuff of the probable formula

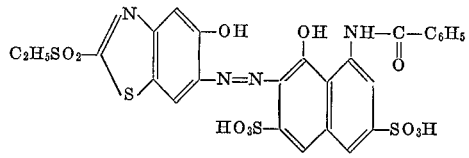

in 300 parts of water are treated at 60° C. and at a pH value of 7 with the 1:1-chromium complex compound of 27.2 parts of the dyestuff of the formula

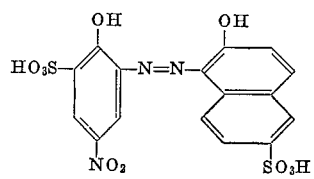

The mixed chromium complex compound thus formed corresponds to the formula

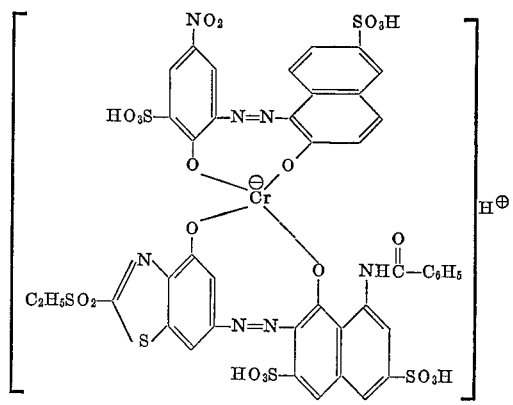

It is precipitated with sodium chloride. The mixed chromium complex dyestuff dyes cotton in accordance with one of the processes given in the preceding examples bluish black shades having excellent fastness to light and to wet processing.

The 1:1-chromium complex compounds and the metal free dyestuffs listed in the following table may likewise be combined to form the unsymmetrical 1:2 mixed chromium complex dyestuffs which exhibit valuable reactive dyestuff properties and which dye cotton black shades.

| 1:1-chromium complex | Metal free dyestuff (probable formula) | Shade |
|---|---|---|
| 4-nitro-2-amino-1-hydroxy-benzene-6-sulphonic acid ⟶ 1-benzoyl-amino-8-hydroxy-naphthalene-3,6-disulphonic acid. | (structure) | Black. |
| 4-nitro-2-amino-1-hydroxy-benzene ⟶ 1-benzoyl-amino-8-hydroxy-naphthalene-3,6-disulphonic acid. | (structure) | Do. |
| 6-nitro-1-amino-2-hydroxy-naphthalene-4-sulphonic acid ⟶ 2-hydroxy-naphthalene. | (structure) | Do. |
| 1-amino-2-hydroxy-naphthalene-4-sulphonic acid ⟶ 1-benzoyl-amino-8-hydroxy-naphthalene-3,6-disulphonic acid. | (structure) | Do. |

EXAMPLE 44

23.2 parts of 2-methylmercapto-6-amino-benzthiazole are pasted with 100 parts of ice and 32 parts by volume of concentrated hydrochloric acid; a thick and almost colorless paste of the hydrochloride is thus obtained. The paste is then diluted with 100 parts of ice and a solution of 8.5 parts of sodium nitrite in little water added at 0°–5° C. within the course of 1 to 2 hours. After this time a clear yellow solution of the diazo compound has formed. To this solution further 300 parts of ice are added and subsequently 20 parts of chlorine conducted into the solution with stirring and within about one hour. The chlorine is rapidly absorbed. The reaction mixture is further stirred for 3 to 4 hours while keeping the temperature below 5° C. The main quantity of excess chlorine is blown off by means of air. The residual amount of chlorine is removed by adding little amounts of sodium sulphite. After clarification the pH of the reaction mixture is adjusted by means of sodium acetate solution to pH 2. A neutral solution of 34.6 parts of 1-amino-8-hydroxy-naphthalene-3,6-disulphonic acid in 200 parts by volume of water is added dropwise within 1 hour. After completion of the coupling reaction the mixture is neutralized with dilute soda-lye.

A diazo suspension prepared by diazotisation of 18.8 parts of 1-aminobenzene-2-sulphonic acid is added to the above said reaction mixture. When the second coupling step is complete the solution is heated to 45° C. and the disazo dyestuff precipitated with 20% of potassium chloride calculated on the volume of the reaction mixture. The product obtained is filtered with suction and dried at 50° C. In form of its free sulphonic acid the dyestuff corresponds to the formula

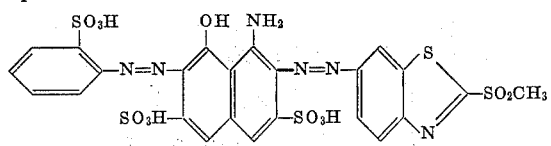

It dyes cotton in accordance with one of the processes given in the preceding examples greenish-blue to black shades having good fastness properties.

EXAMPLE 45

33.6 parts of 2-phenylsulphonyl-6-aminobenzthiazole are poured with stirring into 200 parts of concentrated sulfuric acid at 0° to 10° C. When the component has completely dissolved 38 parts of a 43.3% nitrosyl sulfuric acid are added dropwise at 0° to 10° C. The reaction mixture is stirred in an ice-bath for about 1 hour and then 400 parts of ice added and the initially clear solution treated with 40 parts of calcinated sodium sulfate. The diazo compound thus formed precipitates after short stirring as a thick crystal slurry which is filtered with suction and washed with little saturated sodium chloride solution.

The diazo compound obtained according to the above mentioned process is stirred with 400 parts of ice-water and adjusted to a pH of 1.5 by the addition of crystalline sodium acetate. To this diazo suspension a neutral solution of 37 parts of 1-hydroxy-8-amino-naphthalene-3,6-disulphonic acid in 200 parts of water are added dropwise.

After several hours the acid coupling is complete. The reaction mixture is then neutralized by dropwise adding dilute soda-lye. It is diluted with ice-water and there are then added 20 parts of soda and the diazo suspension obtained from diazotisation of 20.2 parts of 1-aminobenzene-2-sulphonic acid. After completion of the second coupling step the disazo dyestuff obtained is precipitated at 40°–50° C. by the addition of sodium chloride. After drying at 50° C. the dyestuff represents a bluish black powder which dissolves in water with blue coloration. In form of its free sulphonic acid the dyestuff corresponds to the formula

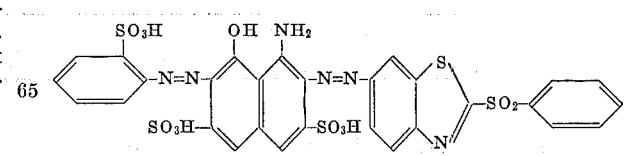

The dyestuff dyes cotton navy blue to black shades having good fastness to wet processing, rubbing and to light.

If the diazo compound used in this example is replaced by one of the following diazo compounds similar dyestuffs are obtained which are likewise distinguished by their good fastness properties.

2-(4'-methylphenylsulphonyl)-6-amino-benzthiazole
2-(4'-chlorophenylsulphonyl)-6-amino-benzthiazole
2-(3'-carboxyphenylsulphonyl)-6-amino-benzthiazole

EXAMPLE 46

The diazonium salt solution prepared in accordance with Example 1 from 23.4 parts of 6-amino - 2 - methyl-sulphonyl-benzthiazole are added to a solution of 10.7 parts of 3 - amino - 1 - methylbenzene (as hydrochloride) in 50 parts of water. The monoazo dyestuff formed is precipitated and filtered with suction and the filter residue washed with dilute hydrochloric acid. The monoazo compoun is then pasted with 400 parts of formamide, 20 parts of concentrated hydrochloric acid and 6.9 parts of sodium nitrite added. The diazo azo compound thus prepared is then given to a solution of 38.4 parts of 1-hydroxynaphthalene-3,6,8-trisulphonic acid in 1500 parts of water. The pH value of the reaction mixture is kept at 8 by the addition of a suspension of calcium hydroxide in water. After 2 hours reaction time the precipitated disazo dyestuff is salted out by the addition of 20% of rock salt, calculated on the volume of the reaction mixture. The precipitated dyestuff is filtered with suction and the filter residue again dissolved in 1500 parts of water and treated with 25 grams of crystaline copper sulfate. At a pH of 5–6 and at 25° C. 55 parts of a 15% solution of hydrogene peroxide are added dropwise within 1 hour, a blue solution thus being formed. After completion of the oxydative coppering the copper complex dyestuff is precipitated by the addition of 20% of rock salt calculated on the volume of the mixture, filtered with suction and dried at 50° C. The dyestuff dyes cotton blue shades with good fasteness properties.

If in this example the starting components are replaced by those of the following table, valuable fibre reactive copper complex diazo dyestuffs are likewise obtained which dye cotton in the shades listed below.

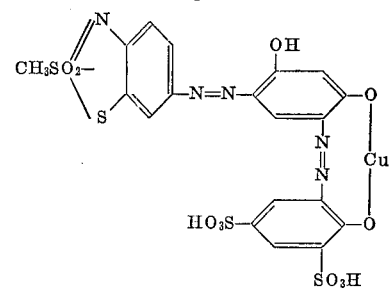

It dyes cotton brown shades.

EXAMPLE 48

13.3 parts of 2-methylsulphonyl - 6 - benzthiazole are diazotized. The diazotisation mixture is added dropwise to a solution of 20.9 parts of 1 - hydroxy-8-acetylamino-naphthalene - 3,6-disulphonic acid and 10 parts of soda in 100 parts of ice-water. After completion of the coupling the dyestuff is salted out with sodium chloride and the precipitated dyestuff filtered with suction.

The dyestuff paste thus obtained is hot dissolved in 1000 parts by volume of water and 80 parts by volume of a 20% sodium acetate solution as well as 80 parts by volume of a 18% copper sulphate solution added. About 160 parts by volume of a 3% hydrogene peroxide solution are added at a pH of 5–6 and at a temperature of 50–60° C. within 1 hour. When the oxydative coppering is complete the copper complex dyestuff formed is precipitated by the addition of sodium chloride and isolated. After drying at 50° C. one obtains a dark powder which dissolves in water with a violet coloration and which dyes cotton according to one of the processes given in the preceding examples violet shade. In form of its free sulphonic acid the dyestuff corresponds to the probable formula

| 1. Diazo component | 2. Diazo component | Azo component | Shade |
|---|---|---|---|
| 6-amino-2-methyl-sulphonyl-benzthiazole | 1-amino-3-hydroxy-acetyl-amino-benzene | 1-hydroxynaphthalene-3,6,8-trisulphonic acid | Blue. |
| 6-amino-5-sulpho-2-methylsulphonyl benzthiazole | 1-amino-naphthalene-6-sulphonic acid | do | Do. |
| 5-amino-6-sulpho-2-methylsulphonyl-benzthiazole | do | do | Do. |

EXAMPLE 47

26.2 parts of the dyestuff of the formula

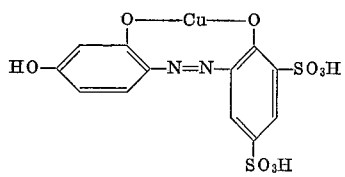

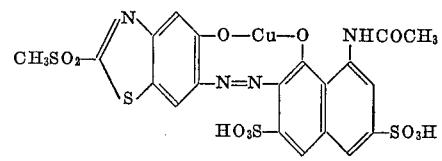

If in this example the starting components are replaced by the diazo and azo components given in the following table similar fibre reactive copper dyestuffs are obtained which dye cotton in the shades indicated below.

| Diazo component | Azo component | Shade of copper complex |
|---|---|---|
| 2-methylsulphonyl-6-amino-benzthiazole | 1-hydroxy-naphthalene-4,8-disulphonic acid | Violet. |
| Do | 2-hydroxy-naphthalene-3,6-dusulphonic acid | Ruby. |
| Do | 1-(4'sulphophenyl)-pyrazolon-(5)-carboxlyic acid-3 | Yellow brown | are dissolved neutral in 200 parts by volume of water and a diazo solution prepared from 13.3 parts of 2-methylsulphonyl - 6 - amino-benzthiazole added. The coupling is completed by the further addition of sodium acetate and the dyestuff is precipitated by means of sodium chloride. After filtering with suction and drying at 50° C. one obtains a dark brown powder which dissolves in water with brown coloration. In form of the free sulphonic acid the dyestuff corresponds to the formula

We claim:
1. The dyestuff of the formula

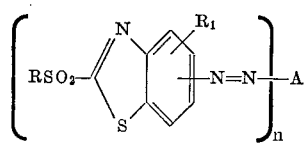

wherein A is selected from the group consisting of

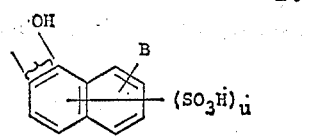
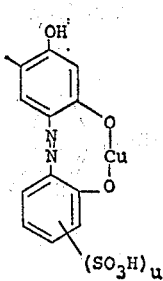
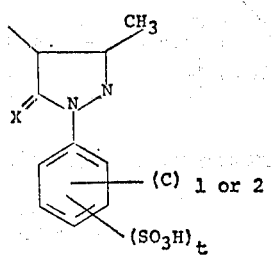
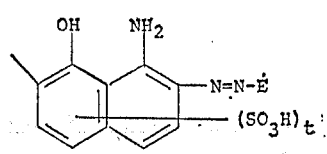
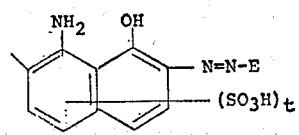
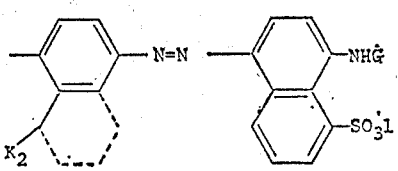
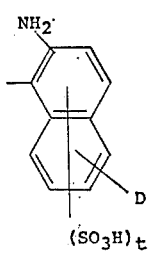
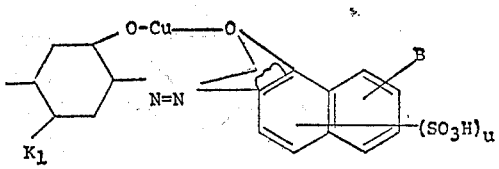

and

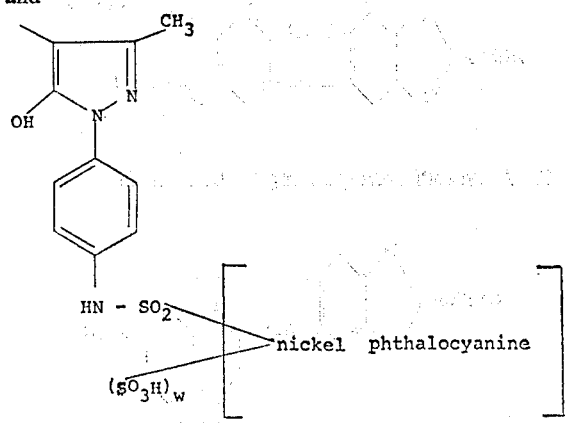

wherein $R_1$ is selected from the group consisting of hydrogen, methyl, sulfonic acid, carboxylic acid, halogen, hydroxy, methoxy, cyano, and sulfonamide; R is selected from the group consisting of lower alkyl containing one to five carbon atoms, phenyl, chloro-phenyl, methyl phenyl, carboxy phenyl, benzyl, tolyl methyl, and benzothiazole-2-yl; B is selected from the group consisting of hydrogen, lower alkoxy, acetamino, benzoyl amino, phenylamino and sulfophenylamino; C is selected from the group consisting of hydrogen, chlorine, bromine, and methyl; D is selected from the group consisting of hydrogen, hydroxy, acetamino and benzoyl amino; E is a diazo residue derived from compounds selected from the group consisting of 1-aminobenzene-2,3 and 4-sulfonic acid, 1-aminobenzene-2,4-disulfonic acid, 1-aminobenzene-2,5-disulfonic acid, 1-amino-2-hydroxybenzene-3,5-disulfonic acid, 1-amino-2-hydroxybenzene-5-sulfonic acid, 1-amino-2-hydroxy-3-chlorobenzene-5-sulfonic acid, 1-amino-2-hydroxy-3-nitrobenzene-5-sulfonic acid, 2-amino naphthalene-1,5-disulfonic acid, 2-amino napthalene-1-sulfonic acid, and 4, 5, 6 or 7-amino-2-methylsulfonyl-benzothiazole; G is selected from the group consisting of acetyl and benzoyl; X stands for O or NH; $K_1$ and $K_2$ are selected from the group consisting of hydrogen, methyl, methoxy, acetamino, benzoyl amino and w-methane sulfonic acid; $u$ stands for a number from one to three; $t$ stands for a number from one to two; $w$ stands for a number from one to three; and $n$ stands for a number from one to two.

2. A dyestuff according to claim 1 wherein A is further selected from the group consisting of

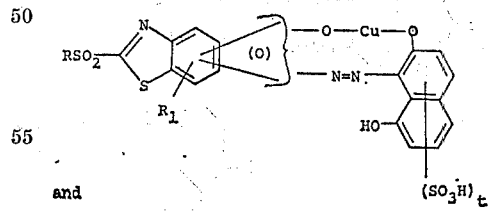

and

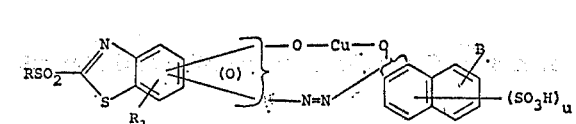

wherein R, $R_1$, $u$ and $t$ are defined as in claim 1 and wherein the two linkages in the condensed benzene ring of the benzothiazole compound are in the ortho position relative to one another.

3. A dyestuff of claim 1 corresponding to the formula

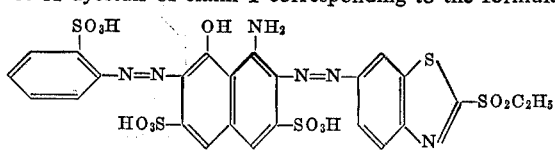

4. A dyestuff of claim 1 corresponding to the formula

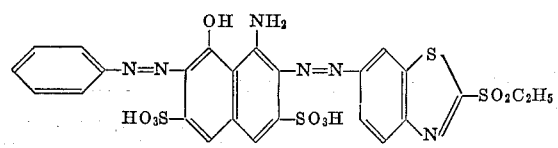

5. A dyestuff of claim 1 corresponding to the formula

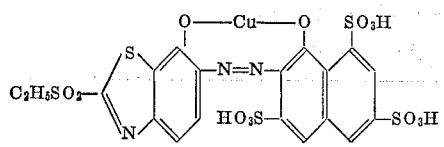

6. A dyestuff of claim 1 corresponding to the formula

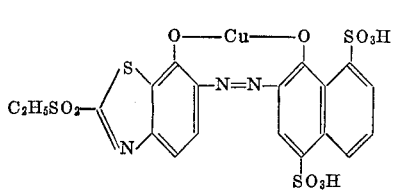

7. A dyestuff of claim 1 corresponding to the formula

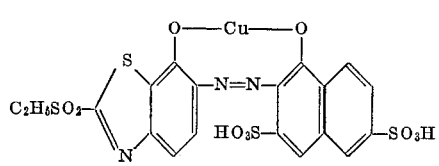

8. A dyestuff of claim 1 corresponding to the formula

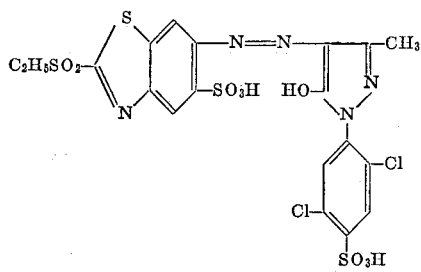

9. A dyestuff of claim 1 corresponding to the formula

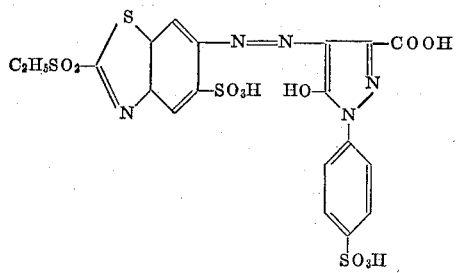

10. A dyestuff of claim 1 corresponding to the formula

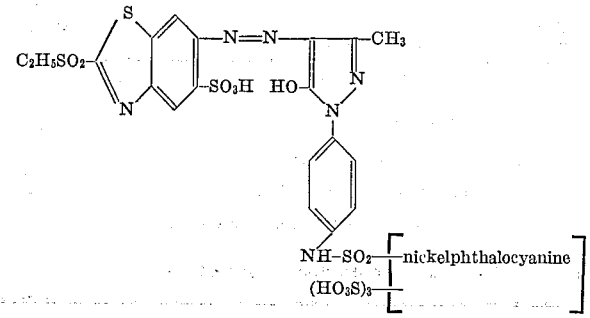

11. A dyestuff of claim 1 corresponding to the formula

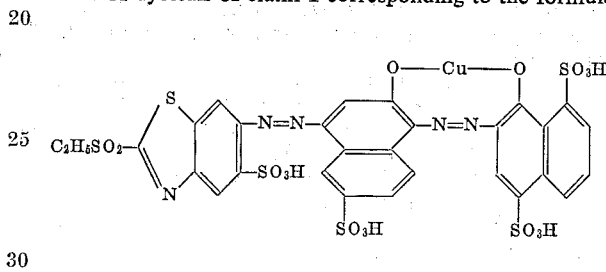

12. A dyestuff of claim 1 corresponding to the formula

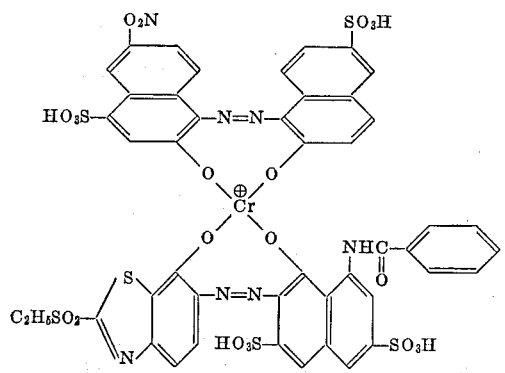

13. A dyestuff corresponding to the formula

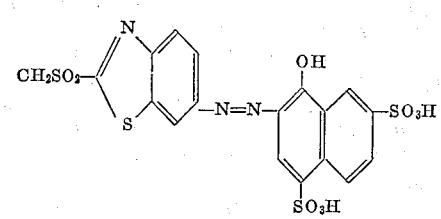

14. A dyestuff corresponding to the formula

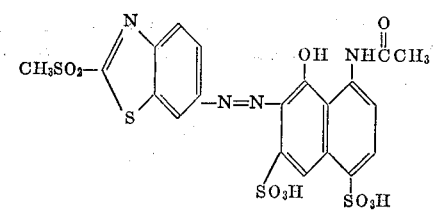

15. A dyestuff corresponding to the formula
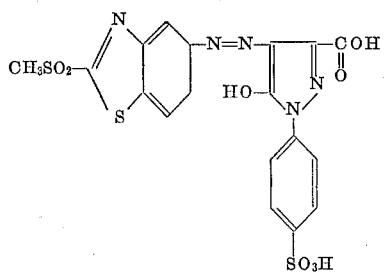
16. A dyestuff corresponding to the formula
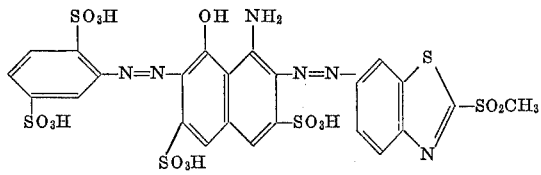
References Cited
UNITED STATES PATENTS
| | | | |
|---|---|---|---|
| 2,785,157 | 3/1957 | Straley et al. | 260—158 |
| 3,246,004 | 4/1966 | Hall et al. | 260—158 XR |
FOREIGN PATENTS
| | | |
|---|---|---|
| 953,887 | 4/1964 | Great Britain. |
| 1,290,839 | 3/1962 | France. |
FLOYD D. HIGEL, Primary Examiner
U.S. Cl. X.R.
8—4, 41, 42, 43, 50, 51; 117—138.8, 144; 260—37, 146, 147, 158, 306, 310, 518, 519